US011597798B2

(12) United States Patent
Michl et al.

(10) Patent No.: US 11,597,798 B2
(45) Date of Patent: Mar. 7, 2023

(54) PORPHENE, A HETEROCYCLIC ANALOG OF GRAPHENE, METHODS OF MAKING AND USING THE SAME

(71) Applicant: The Regents of the University of Colorado, A Body Corporate, Denver, CO (US)

(72) Inventors: Josef Michl, Boulder, CO (US); Thomas Frank Magnera, Boulder, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 0 days.

(21) Appl. No.: 17/112,865

(22) Filed: Dec. 4, 2020

(65) Prior Publication Data

US 2021/0171704 A1     Jun. 10, 2021

Related U.S. Application Data

(60) Provisional application No. 62/943,637, filed on Dec. 4, 2019.

(51) Int. Cl.
  *C08G 61/12*   (2006.01)
  *C08G 85/00*   (2006.01)

(52) U.S. Cl.
  CPC ......... *C08G 61/122* (2013.01); *C08G 85/004* (2013.01); *C08G 2261/3241* (2013.01); *C08G 2261/374* (2013.01); *C08G 2261/376* (2013.01); *C08G 2261/40* (2013.01)

(58) Field of Classification Search
  CPC .. C08G 75/00; C08G 2261/91; C08G 61/122; C08G 85/004; C08G 2261/3241; C08G 2261/374; C08G 2261/376; C08G 2261/40; H01L 51/0047; Y02E 10/549
  See application file for complete search history.

(56) References Cited

U.S. PATENT DOCUMENTS

| | | | | |
|---|---|---|---|---|
| 2004/0202876 A1* | 10/2004 | Kobuke | ................ | H01L 51/009 428/457 |
| 2005/0224112 A1* | 10/2005 | Tokita | ..................... | C09B 47/00 250/214 LS |
| 2011/0168984 A1* | 7/2011 | Forrest | .................... | H01L 51/42 534/14 |
| 2012/0001155 A1* | 1/2012 | Thompson | .......... | H01L 51/0077 257/E51.026 |

OTHER PUBLICATIONS

Bull et al., "Tetraphenylporphyrin monolayers: Formation at the air-water interface and characterization on glass supports by absorption and fluorescence spectroscopy," Journal of Colloid and Interface Science, vol. 92, No. 1, Mar. 1983, pp. 1-12.

(Continued)

*Primary Examiner* — Shane Fang
(74) *Attorney, Agent, or Firm* — Sheridan Ross P.C.

(57) ABSTRACT

Methods of forming a porphene polymeric material are provided. The resulting material can be a porphene or a metalloporphene polymeric material. The structure of the polymer can be selected based on a material provided in the monomer material. Methods of using the polymeric material are also provided.

5 Claims, 18 Drawing Sheets

(15 of 18 Drawing Sheet(s) Filed in Color)

(56) References Cited

OTHER PUBLICATIONS

Cho et al., "Photophysical Properties of Porphyrin Tapes," Journal of the American Chemical Society, vol. 124, No. 49, Nov. 16, 2002, pp. 14642-14654.
Dai et al., "Synthesis of a Two-Dimensional Covalent Organic Monolayer through Dynamic Imine Chemistry at the Air/Water Interface," Angewandte Chemie International Edition, vol. 55, 2016, pp. 213-217.
Dong et al., "Interface-Assisted Synthesis of 2D Materials: Trend and Challenges," Chemical Reviews, vol. 118, No. 13, Jun. 18, 2018, pp. 6189-6235.
Dong et al., "Large-Area, Free-Standing, Two-Dimensional Supramolecular Polymer Single-Layer Sheets for Highly Efficient Electrocatalytic Hydrogen Evolution," Angewandte Chemie International Edition, vol. 54, No. 41, Aug. 26, 2015, pp. 12058-12063.
Jones et al., "Langmuir-Blodgett films of simple esterified porphyrins," Proceedings of the First International Conference on Langmuir-Blodgett Films, Sep. 1982, pp. 25-32.
Nakamura et al., "A Directly Fused Tetrameric Porphyrin Sheet and Its Anomalous Electronic Properties That Arise from the Planar Cyclooctatetraene Core," Journal of the American Chemical Society, vol. 128, 2006, pp. 4119-4127.
Ogawa et al., "Completely Regioselective Synthesis of Directly Linked meso,meso and meso,βPorphyrin Dimers by One-Pot Electrochemical Oxidation of Metalloporphyrins," Angewandte Chemie International Edition, vol. 38, No. 1-2, Jan. 15, 1999, pp. 176-179.
Osuka et al., "meso, meso-Linked Porphyrin Arrays," Angewandte Chemie International Edition, vol. 36, No. 1-2, Feb. 3, 1997, pp. 135-137.
Palagin et al., "Building Two-Dimensional Polymers by the Langmuir-Blodgett Technique," Thin Films, vol. 20, 1995, pp. 69-82.
Peng et al., "Structures of Mixed Langmuir-Blodgett Films of Tetrakis(3,5-di-tert-butylphenyl)porphinatocopper(II) with Cadmium Arachidate: A Grazing Incidence Synchrotron X-ray Diffraction Study," Langmuir, vol. 16, No. 2, Oct. 28, 1999, pp. 607-611.
Peng et al., "X-ray Scattering Studies of Mixed Langmuir Monolayers and Langmuir-Blodgett Films of a Noncentrosymmetric Porphyrin with Cadmium Arachidate," Langmuir, vol. 17, No. 6, Feb. 14, 2001, pp. 1936-1940..
Porteu et al., "Synthesis Of 2-D polymer from semi-amphiphilic Langmuir-Blodgett (LB) films," Makromolekulare Chemie/ Macromolecular Symposia, vol. 46, No. 1, Jun. 1991, pp. 37-45.
Posligua et al., "Band structures of periodic porphyrin nanostructures," Journal of Physical Chemistry C, vol. 122, No. 41, Sep. 25, 2018, pp. 23790-23798.
Sahabudeen et al., "Wafer-sized multifunctional polyimine-based two-dimensional conjugated polymers with high mechanical stiffness," Nature Communications, vol. 7, No. 13461, Nov. 16, 2016, 8 pages.
Sha et al., "Formation of Electrically Conducting Polypyrrole Fine Lines in Arachidic Acid Langmuir-Blodgett Films," Japanese Journal of Applied Physics, vol. 34, No. 7B, 1995, pp. L929-L932.
Tan et al., "Stable ferromagnetism and half-metallicity in two-dimensional polyporphyrin frameworks," RSC Advances, vol. 3, No. 19, Mar. 4, 2013, pp. 7016-7022.
Thomas et al., "Design and Synthesis of Two-Dimensional Covalent Organic Frameworks with Four-Arm Cores: Prediction of Remarkable Ambipolar Charge-Transport Properties," Materials Horizons, vol. 6, May 22, 2019, pp. 1-7.
Tromer et al., "Diboron-porphyrin monolayer: A new 2D semiconductor," Computational Materials Science, vol. 172, Feb. 1, 2020, pp. 109338-109344.
Tsuda et al., "Fully Conjugated Porphyrin Tapes with Electronic Absorption Bands That Reach into Infrared," Science, vol. 293, No. 5527, Jul. 6, 2001, pp. 79-82.
Tsuda et al., "Syntheses, Structural Characterizations, and Optical and Electrochemical Properties of Directly Fused Diporphyrins," Journal of the American Chemical Society, vol. 123, No. 42, Sep. 26, 2001, pp. 10304-10321.
Vandevyver et al., "Structure of porphyrin multilayers obtained by the Langmuir Blodgett technique," Journal of Colloid and Interface Sicence, vol. 85, No. 2, Feb. 1982, pp. 571-585.
Vorotyntsev et al., "Magnesium(II) polyporphine: The first electron-conducting polymer with directly linked unsubstituted porphyrin units obtained by electrooxidation at a very low potential," Electrochimica Acta, vol. 55, No. 22, Sep. 1, 2010, pp. 6703-6714.
Wiengarten et al., "Surface-assisted Dehydrogenative Homocoupling of Porphine Molecules," Journal of the American Chemical Society, vol. 136, No. 26, Jun. 23, 2014, pp. 9346-9354.
Yamaguchi, "Theoretical prediction of electronic structures of fully π-conjugated zinc oligoporphyrins with curved surface structures," Journal of Chemical Physics, vol. 120, No. 17, Apr. 13, 2004, pp. 7963-7970.
Yamaguchi, "Theoretical study of two-dimensionally fused zinc porphyrins: DFT calculations," Quantum Chemistry, vol. 109, No. 7, Feb. 4, 2009, pp. 1584-1597.
Yamaguchi, "Transport properties of two-dimensionally fused zinc porphyrins from linear-response approach," Quantum Chemistry, vol. 111, No. 12, Aug. 31, 2010, pp. 3230-3238.
Zhao et al., "Synthesis of porphyrin-based two-dimensional metal-organic framework nanodisk with small size and few layers," Journal of Materials Chemistry A, vol. 6, 2018, pp. 2828-2833.

\* cited by examiner

PORPHENE, A HETEROCYCLIC ANALOG OF GRAPHENE, METHODS OF MAKING AND USING THE SAME

CROSS REFERENCE TO RELATED APPLICATIONS

This application claims priority and the benefit under 35 U.S.C. § 119(e) to U.S. Provisional Application Ser. No. 62/943,637, filed on Dec. 4, 2019, which is incorporated by reference in its entirety.

GOVERNMENT LICENSE RIGHTS

This invention was made with government support under grant number W911NF-15-1-0435 awarded by the U.S. Army research Office and grant number CHE 1900226 awarded by the National Science Foundation. The government has certain rights in the invention.

FIELD OF THE INVENTION

The present invention relates to a porphene polymer material. The invention also relates to methods of making and using the porphene material.

BACKGROUND

Graphene is an atomically thin material made of carbon atoms arranged in a honeycomb pattern in a plane. Graphene has exceptional strength and conductivity, while remaining lightweight. Thus, graphene is a versatile material. However, alternatives to graphene are difficult to produce.

SUMMARY

The present invention relates to a porphene polymer, methods of making the same and methods of using the same. This 2-dimensional polymer includes fused macrocyclic porphyrin rings. Parent porphene ("free base") has two protons in the center of each macrocycle. In each macrocycle they can be arranged in two ways, and this permits a very large number of possible tautomers that differ only in the positions of the protons. Two examples of tautomers are illustrated in FIGS. 1A and 1B. The calculated relative energy of the structure from FIG. 1A is 3.6 kcal/mol. The calculated relative energy of the structure illustrated in FIG. 1B is 9.9 kcal/mol. These two potential structures of free-base porphene are calculated using DFT-PB-D3BJ with plane-vawe basis set (450 eV cutoff) with PAW for the core electrons using a gamma-centered 551 k-point mesh and unit cell parameters optimization of 520 eV cutoff with a constant cell volume. In the structure of FIG. 1A the orientation of the diagonally disposed hydrogen atoms alternates for various monomers. In the structure of FIG. 1B, the orientation of the diagonally disposed hydrogen atoms remains constant.

The two protons in the center of each macrocycle can be replaced with a divalent metal ion $M^{2+}$, which can carry zero, one, or two neutral or charged ligands (illustrated in FIG. 2). Examples of such ligands are water, ammonia, carbon monoxide, chloride, cyanide, oxide, and pyridine. M can be selected from a group consisting of about 60 different elements that have already been inserted into monomeric porphyrins by many investigators over the years: $Zn^{2+}$, $Fe^{2+}$, $Pt^{2+}$, $Ni^{2+}$, or other examples as set forth in K. Kadish K. Smith, R. Guilard, The Porphyrin Handbook, Academic Press 2000-2003 ("Porphyrin Handbook") (incorporated by reference in its entirety).

Porphene resembles graphene in being a fully conjugated π-electron system, yet differs from it in that it is composed of fused porphyrin units rather than fused benzene units. This provides it with fourfold symmetry and, importantly, allows functionalization by ligand attachment to metal dications that can be contained in the centers of the porphyrin rings in lieu of the two protons present in the parent porphene. This functionalization can be accomplished without removal of any π centers from conjugation. FIG. 2 illustrates structures of metalloid porphene where M represents a metal dication. The square shows one monomer unit. In FIG. 2, M represents an inserted metal dication that replaces the two internal protons, producing an electroneutral structure. Porphene, whose name was coined to indicate the nature of the monomeric unit and the relation to graphene, thus actually is a family of structures rather than a single substance, because upon removal of the two nitrogen-bound protons, its macrocyclic rings offer sites for a wide variety of metallic or even non-metallic doubly positive cations and their ligands.

FIGS. 3A-3C illustrate isomers of zinc porphene (i.e. M=Zn). FIG. 3A illustrates a Zn-porphene polymer, whose calculated relative energy is about 0.85 kcal/mol per macrocycle (with respect to the lowest energy isomer). In the porphene polymer, the bonding is characterized by meso-meso bonds (bonds between six membered rings of adjacent porphyrin monomers) and beta-beta bonds (bonds between five membered rings of adjacent porphyrin monomers). FIG. 3B illustrates a Zn-isoporphene polymer, whose calculated relative energy is 0 kcal/mol per macrocycle, as this is the lowest energy isomer identified. In the isoporphene polymer, the monomer fusion is characterized by both meso-beta bonds (bonds between a six membered ring and five membered ring of adjacent porphyrin monomers) and beta-beta bonds. FIG. 3C illustrates a Zn-neoporphene polymer, whose calculated relative energy is about 201.32 kcal/mol per macrocycle. The bonding is characterized by meso-beta bonds. The zinc porphene and zinc isoporphene polymers are similar in the calculated relative energy, while the relative energy of zinc neoporphene is much greater.

Porphene polymer and its metallated analogs (metalloporphenes) do not occur in nature and are not believed to have been previously synthesized. However, Osuka and collaborators used a two-step oxidative coupling procedure in bulk solution to combine blocked and solubilized monomers and synthesized several compounds whose ribbon-shaped molecules contain two or up to a dozen or so fused porphyrin rings carrying substituents at their edges. They also synthesized a 2×2 square molecule containing four fused porphyrin macrocycles. This information is set forth in Y. Nakamura, N. Aratani, H. Shinokubo, A. Takagi, T. Kawai, T. Matsumoto, Z. S. Yoon, D. K. Kim, T. K. Ahn, D. Kim, A. Muranaka, N. Kobayayashi, A. Osuka, A directly fused tetrameric porphyrin sheet and its anomalous electronic properties that arise from the planar cyclooctatetraene core. *J. Am. Chem. Soc.* 128, 4119-4127 (2006); H. Shimidzu, A. Osuka, Meso, meso-linked porphyrin arrays, *Angew. Chem. Int. Ed. Engl.* 36, 135-137 (1997); A. Tsuda, A. Osuka, Fully conjugated porphyrin tapes with electronic absorption bands that reach into infrared. *Science* 293, 79-82 (2001); A. Tsuda, H. Furuta, A. Osuka, Synthesis, structural characterizations, and optical and electrochemical properties of directly fused diporphyrins. *J. Am. Chem. Soc.* 123, 10304-10321 (2001); H. S. Cho, D. H. Jeong, S. Cho, D. Kim, Y.

Matsuzaki, K. Tanaka, A. Tsuda, A. Osuka, Photophysical properties of porphyrin tapes. *J. Am. Chem. Soc.* 124, 14642-14645 (2002); T. Ogawa, Y. Nishimoto, N. Yoshida, N. Ono, A. Osuka, Completely regioselective synthesis of directly linked meso,meso and meso,β porphyrin dimers by one pot electrochemical oxidation of metalloporphyrins. *Angew. Chem. Int. Ed. Engl.* 38, 176-179 (1999) (each of which are incorporated by reference in their entirety). These molecules are not polymers but can be viewed as nanoporphenes similarly as pentacene is a nanographene.

Also, anodic oxidation of magnesium porphyrin in bulk solution caused a coating of the electrode surface with a macroscopically thick conducting layer of three-dimensionally cross-linked polymer of unknown structure, undoubtedly containing porphyrin rings. This information is set forth in M. A. Vorotyntsev, D. V. Konev, C. H. Devillers, I. Bezverkhyy, O. Heintz, Magnesium(II) polyporphene: The first electron-conducting polymer with directly linked unsubstituted porphyrin units obtained by electrooxidation at a very low potential. *Electrochimica Acta* 55, 6703-6714 (2010) (incorporated by reference in its entirety). This is not porphene nor metalloporphene, which are one atom thick and have a regular periodic structure. Several two-dimensional polymers, including some in which porphyrin rings are connected by linear butadiyne units have been reported, and large area films were prepared via a Schiff-base polycondensation with metalloporphyrins, (see e.g. R. Dong, T. Zhang, X. Feng, Interface-assisted synthesis of 2D materials: Trend and challenges. *Chem. Rev.* 118, 6189-6235 (2018); A. Wiengarten, K. Seufert, W. Auwarter, D. Ecija, K. Diller, F. Allegretti, F. Bischoff, S. Fischer, D. A. Duncan, A. C. Papageorgiou, F. Klappenberger, R. G. Acres, T. H. Ngo, J. V. Barth, Surface-assisted Dehydrogenative Homocoupling of Porphine Molecules. *J. Am. Chem. Soc.* 136, 9346-9354 (2014); S. Thomas, H. Li, R. R. Dasari, A. M. Evans, I. Castano, T. G. Allen, 0. G. Reid, G. Rumbles, W. R. Dichtel, N. C. Gianneschi, S. R. Marder, V. Coropceanu, J.-L. Brédas, Design and synthesis of two-dimensional covalent organic frameworks with four-arm cores: prediction of remarkable ambipolar charge-transport properties. *Mater. Horiz.* 6, 1868-1876 (2019); F. Porteu, S. Palacin, A. Ruaudel-Teixier, A. Barraud, "Synthesis Of 2 D polymer from semi amphiphilic Langmuir Blodgett (LB) films" in *Makromolekulare Chemie. Macromolecular Symposia*, (Basel: Huthig & Wepf Verlag, 1991), vol. 46, pp. 37-45; S. Palacin, F. Porteu, A. Ruaudel-Teixier, Building two-dimensional polymers by the Langmuir-Blodgett technique. *Thin Films* 20, 69 (1995); T. F. Magnera, J. Michl, Towards a more regular square grid polymer. Atualidades *de Fisico-Quimica Orgânica* 50-55 (1998) (each of which is incorporated by reference in its entirety)). Once again, these structures are distinctly different from that of porphene.

Although the synthesis of porphene and metalloporphenes of the present invention have never been reported or claimed before, results of several quantum mechanical calculations for infinite sheets of porphene and metalloporphenes have been published without suggesting how such then hypothetical polymer could be synthesized. This information is set forth in Y. Yamaguchi, Theoretical study of two-dimensionally fused zinc porphyrins: DFT calculations. *Int. J. Quantum Chem.* 109, 1584-1597 (2009); Y. Yamaguchi, Transport properties of two-dimensionally fused zinc porphyrins from linear-response approach. *Int. J. Quantum Chem.* 111, 3230-3238 (2011); Y. Yamaguchi, Theoretical prediction of electronic structures of fully π-conjugated zinc-oligoporphyrins with curved surface structures. *J. Chem. Phys.* 120, 7963-7970 (2004); J. Tan, W. Li, X. He, M. Zhao, Stable ferromagnetism and half-metallicity in two-dimensional polyporphyrin frameworks. *RSC Advances* 3, 7016-7022 (2013); J. Tan, W. Li, X. He, M. Zhao, Stable ferromagnetism and half-metallicity in two-dimensional polyporphyrin frameworks, *RSC Advances* 3, 7016-7022 (2013); V. Posligua, A. Aziz, R. Haver, M. D. Peeks, H. L. Anderson, R. Grau-Crespo, Band structures of periodic porphyrin nanostructures. *J. Phys. Chem. C.* 122, 23790-23798 (2018); R. M. Tromer, I. M. Felix, A. Freitas, S. Azevedo, L. F. C. Pereira, Diboron-porphyrin monolayer: A new 2D semiconductor. *Comput. Mater. Sci.* 172, 109338-109344 (2020) (each of which are incorporated by reference in their entirety). These calculations predicted remarkable properties. For instance, zinc porphene has been predicted to possess metallic electrical conductivity and to become superconducting below 0.5 K. (see Yamaguchi, Y. Int. J. Quantum Chem. 2011, 111, 3230-38, (incorporated by reference)). Further, no methods for the synthesis of porphene were suggested, much less actually produced.

An aspect of the invention is a method to form porphene and metalloporphene polymers. In embodiments of the present invention, porphene can be produced by oxidative coupling of monomeric or oligomeric porphyrins located on a liquid surface. In some embodiments, the liquid can be an aqueous fluid, for example water. The water can be pure or can contain additives. Additives can include chlorides, nitrates, or acetates of zinc, iron, platinum, and nickel, or other metal salts (including divalent metal salts with an inert anion). An oxidant can be provided in the liquid subphase or the gaseous or liquid superphase to induce oxidative polymerization of the monomeric or oligomeric porphyrin or metalloporphyrin molecules contained in the interface. These molecules are present in controllable surface concentrations that correspond to mean molecular areas of about 0.5 to about 2 $nm^2$ per molecule. The control of the surface concentration is critical and part of the craft and it is envisioned that means other than those afforded by a Langmuir trough, such as sessile and tensile drops in a tensiometer, bubbles, funnels, etc. can be employed. The oxidant is present in large molar excess, and its concentration in the bulk subphase typically is between 0.01 mM and 10 mM, in some embodiments about 0.01 mM, about 0.1 mM, 0.4 mM, about 0.5 mM, about 1 mM, about 2 mM, about 3 mM, about 4 mM, about 5 mM, about 6 mM, about 7 mM, about 8 mM, about 9 mM, about 10 mM, or any range within any two of these values. The choice of oxidant can be restricted by the requirement that its redox potential must be more positive than that of the monomeric porphyrin or metalloporphyrin that is to be coupled into porphene. In some embodiments, the oxidant can be $K_2IrCl_6$. Other suitable oxidants can include $Ce(NO_3)_6^{2+}$, $ClO_2$, $ClO_3^-$, $Ru(bipy)_n^{3+}$, $Os(bipy)_n^{3+}$, or $Ru(CN)_6^{3-}$. In some embodiments, oxidants with an oxidation potential above that of the monomeric porphyrin or metalloporphyrin can be used (e.g., higher than about 0.6 V against Ag/AgCl), but not so high that oxidant would attack and destroy the underlying porphene framework (e.g. less than about 1.5 V against Ag/AgCl). The coupling process can be detected within minutes of commencing the reaction, and the rate of reaction and thus the time of completion can be controlled by the choice of the porphyrin surface concentration, the oxidant, the bulk concentration of the oxidant, and by the temperature, which is typically between about 0° C. and about 100° C., in some embodiments about 0° C., about 10° C., about 20° C., about 30° C., about 40° C., about 50° C., about 60° C., about 70° C., about 80° C., about 90° C., or about 100° C., or any range within any two of these values. In some embodiments, the temperature can be about room temperature (approximately 22-30° C.). One skilled in the art would understand how the rate of the polymerization depends on these factors, and would understand that to increase the reaction rate, one could for example, increase the concentration of the oxidant, increase the temperature of the reaction, and/or increase the surface concentration of the monomer, all of which can be determined without undue experimentation. Under a suitable set of conditions, a bilayer of free base porphene is the product of the oxidative coupling. In embodiments of the invention, the free base porphene bilayer can be produced wherein the starting surface concentration includes a mean molecular area (mmA), the mmA of the free base monomer is between about 100 Å$^2$ and about 150 Å$^2$, in some embodiments about 100 Å$^2$, about 110 Å$^2$, about 115 Å$^2$, about 120 Å$^2$, about 125 Å$^2$, about 130 Å$^2$, about 135 Å$^2$, about 140 Å$^2$, or about 150 Å$^2$, or any range within any two of these values, on an aqueous subphase containing between about 0.01 mM to about 10 mM of oxidant, in some embodiments between about 0.05 mM to about 0.5 mM of oxidant, in some embodiments about 0.05 mM, about 0.1 mM, about 0.15 mM, about 0.2 mM, about 0.25 mM, about 0.3 mM, about 0.35 mM, about 0.4 mM, about 0.45 mM, about 0.5 mM, or any range within any two of these values, in still other embodiments about 0.1 mM $K_2IrCl_6$ kept at room temperature (between about 22° C. and about 35° C.) for between about 12 hours and about 48 hours, in some embodiments about 12 hours, about 16 hours, about 18 hours, about 20 hours, about 22 hours, or about 24 hours, or any range within any two of these values. The mean molecular area ranges listed above would be expected to be reduced by one half for any monomer porphyrin that remains a π-stacked dimer after application to the subphase.

In some embodiments, the starting porphyrin can be the free base, in others, it is a metalloporphyrin, in which a dication metal or other ion replaced the two protons normally present in the center of the macrocycle. Examples of suitable dications include $Zn^{2+}$, $Pt^{2+}$, and $Ni^{2+}$. Some of these cations, such as $Zn^{2+}$, yield the same bilayer as a starting free-base porphyrin, whereas yield other morphologies, such as $Ni^{2+}$ which yields predominantly tubes instead of sheets. On an aqueous subphase, before oxidative coupling, such ions do not leach into the subphase over a period of hours. After the oxidative coupling that forms the metalloporphene polymer, the metal ions are leached into the aqueous subphase fast, as quickly as within a few hours.

The nature of the dications contained in the starting metalloporphyrin can affect the outcome of the coupling reaction and the structure of the porphene, i.e. whether a single sheet of polymer is formed, or a pair of sheets in contact (double layer, bilayer), or tubes. The symmetry and structure of the unit cell of the periodic porphene polymer formed and its thickness were determined by in-situ grazing incidence X-ray diffraction (GIXD) and X-ray reflectivity at the air/water interface (both the peaks present and those absent are important) and by other imaging techniques, such as atomic force microscopy (AFM), scanning tunneling microscopy (STM), and transmission electron microscopy (TEM).

Because of the presence of a strong oxidant, the porphene polymer is partially oxidized (doped with holes) and positively charged. X-ray reflectivity measurement revealed a layer of electron density exceeding that of pure water, presumably due to negative counterions that compensate the positive charge on the polymer. The counterion present depends on the oxidant used (e.g. hexachloroiridate). The positive charge on the polymer also accounts for the ease with which metal ions are expelled into the aqueous subphase.

In the structures shown, the metal ions have been leached out by long contact with the aqueous subphase and the structures are those of parent porphene, where M stands for two protons. The interatomic distances and angles in the single sheet of porphene are those expected from the classical chemical structure illustrated in FIG. 2, and its thickness is that of a single atom. In the porphene bilayer produced starting with zinc porphyrin, the second layer is offset by half the distance between the macrocycle centers in the direction of the edge of the unit cell. The two sheets are parallel and are separated by 0.57 nm. The separation can also depend on the presence or absence of ligands on the material. The average lateral extent of single and double sheets of porphene formed by the oxidative coupling process on the aqueous subphase can be controlled by choice of reaction conditions and ranges from 2 nm up to several mm across a sheet, in some embodiments between 2 mm and about 10 mm, in some embodiments about 2 mm, about 3 mm, about 4 mm, about 5 mm, about 6 mm, about 7 mm, about 8 mm, about 9 mm, about 10 mm, or any range between any two of these values. The size of the LB trough used can often times be the limiting factor on the allowable size of the material. The diameter of the tubes varies from tube to tube and ranges from about 4 nm to about 15 nm, in some embodiments about 4 nm, about 5 nm, about 6 nm, about 7 nm, about 8 nm, about 10 nm, about 12 nm, or about 15 nm, or any range between any two of these values. The length of the tubes also varies from tube to tube and can be between about 1000 nm to about 10000 nm, in some embodiments about 1000 nm, about 2000 nm, about 3000 nm, about 4000 nm, about 5000 nm, about 6000 nm, about 7000 nm, about 8000 nm, about 9000 nm, or about 10000 nm, or any range between any two of these values. The insertion of a metal cation of choice is accomplished by starting with the above described procedure for free-base porphene and after reaching the highly oxidized coupled state, a reductant such as NaI or $Na_2SO_3$ can be introduced to reduce the highly oxidized state of the polymer to neutral. In the neutral state the polymer is exposed to a solution of a metal salt such as $ZnCl_2$ or $FeCl_2$ of suitable solubility and concentration combined with any convenient inert anion allowing the displacement of the two hydrogens in each cell of the porphene polymer by the metal.

The infrared spectrum of the resultant polymer will show the absence of the normal modes associated with the N—H bonds and associated appearance of bands relatable to the introduction of the metal to the macrocycle.

After synthesis, the porphene sheets or tubes formed can be transferred to a solid substrate (see e.g. FIG. 11). The transfer can induce tears. FIG. 12 shows tears in a sheet of a porphene bilayer transferred to a germanium substrate and FIG. 13, terraces of highly ordered pyrolytic graphite (HOPG) draped by a sheet of porphene.

FIGS. 4A-4C illustrate a mechanism for the formation of porphene by oxidative coupling on a surface. FIG. 4A illustrates a mechanism showing monomer coupling mechanism to form a dimer through meso-meso bond formation, in FIG. 4B the dimer further growth mechanism to form a trimer. FIG. 4C illustrates the macrocycle fusion mechanism of the dimer through meso-meso and beta-beta bond formation.

A Langmuir-Blodgett (LB) trough can be used to set an exposed surface area of the liquid, but is not the only means for doing so. It permits a convenient transfer of the polymerization product to a solid substrate. In some embodiments, the exposed surface area of the liquid can be as small as about 100 nm$^2$ to more than 1000 cm$^2$. During the oxidative coupling process, the in situ measured UV-visible absorption spectrum showed a gradual disappearance of the Soret band of the monomer in the UV and gradual increase of poorly structured absorbance attributed to porphene in the visible region.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

Figure 1A:
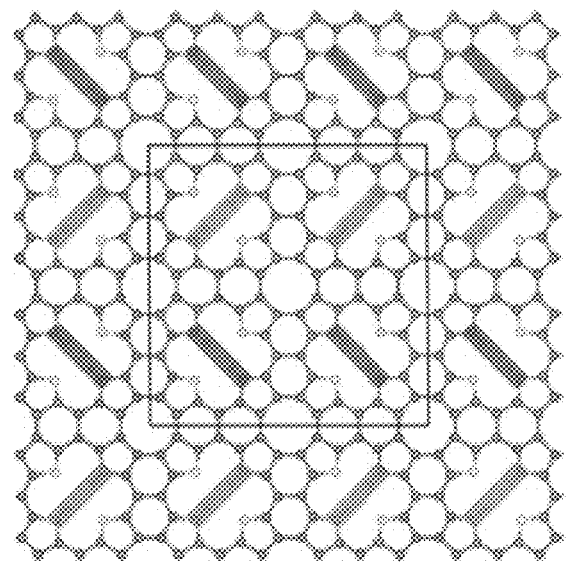
FIG. 1A illustrates a first tautomer of a free-base porphene wherein the bonds with hydrogen are diagonally disposed in the different directions.
Figure 1B:
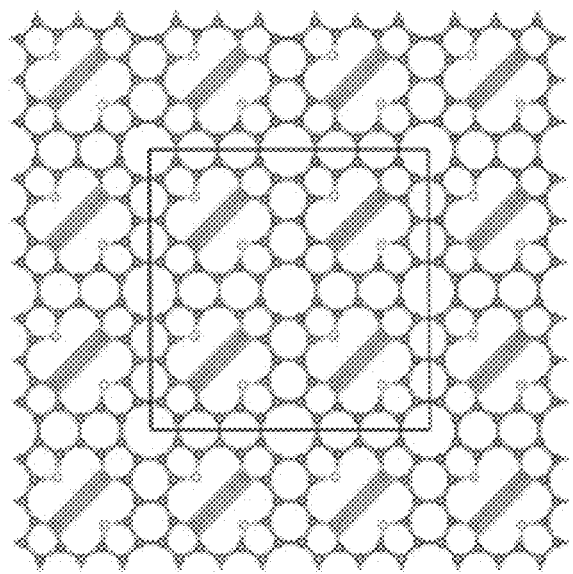
FIG. 1B illustrates a second tautomer of a free-base porphene wherein the bonds with hydrogen diagonally disposed in the same direction.
Figure 2:
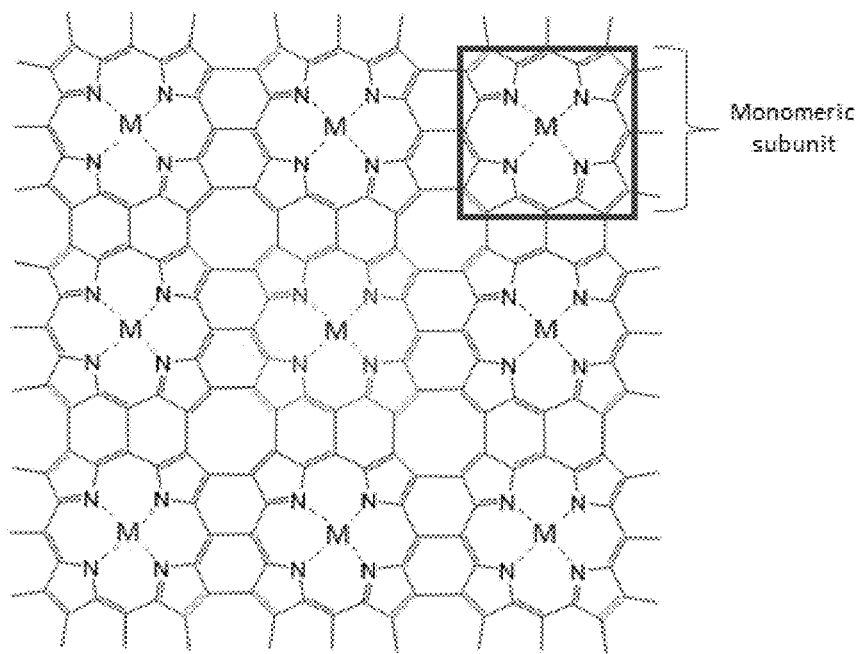
FIG. 2 illustrates structures of metalloid porphene where M represents a metal dication.
Figure 3A:
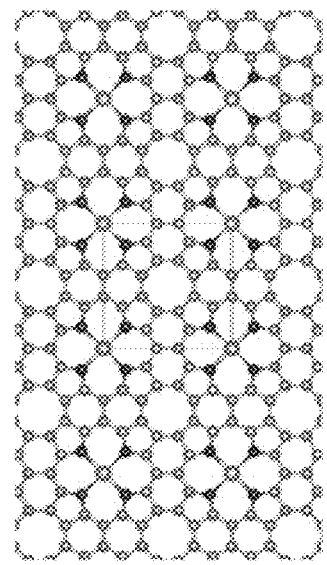
FIG. 3A illustrates a zinc porphene polymer, wherein the calculated relative energy is about 0.85 kcal/mol per macrocyclic unit, relative to the most stable isomer.
Figure 3B:
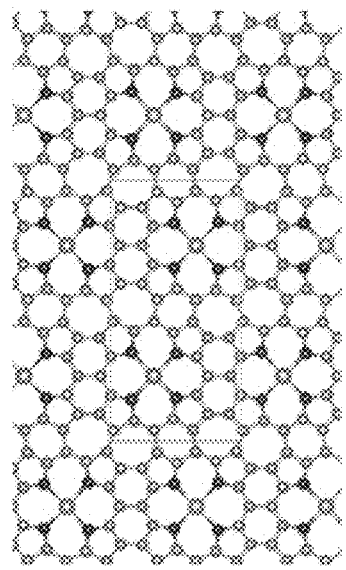
FIG. 3B illustrates a zinc isoporphene polymer, wherein the calculated relative energy is 0 kcal/mol per macrocyclic unit, this is the most stable isomer.
Figure 3C:
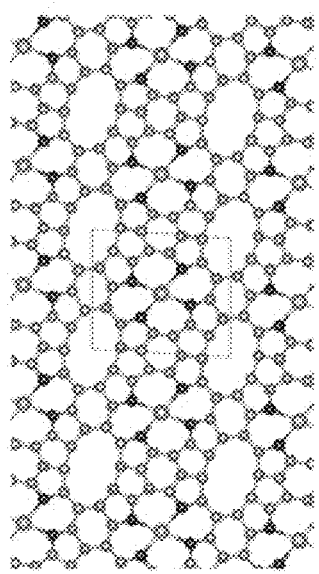
FIG. 3C illustrates a zinc neoporphene polymer, wherein the calculated relative energy is about 201.32 kcal/mol per macrocyclic unit, relative to the most stable isomer.
Figure 4A:
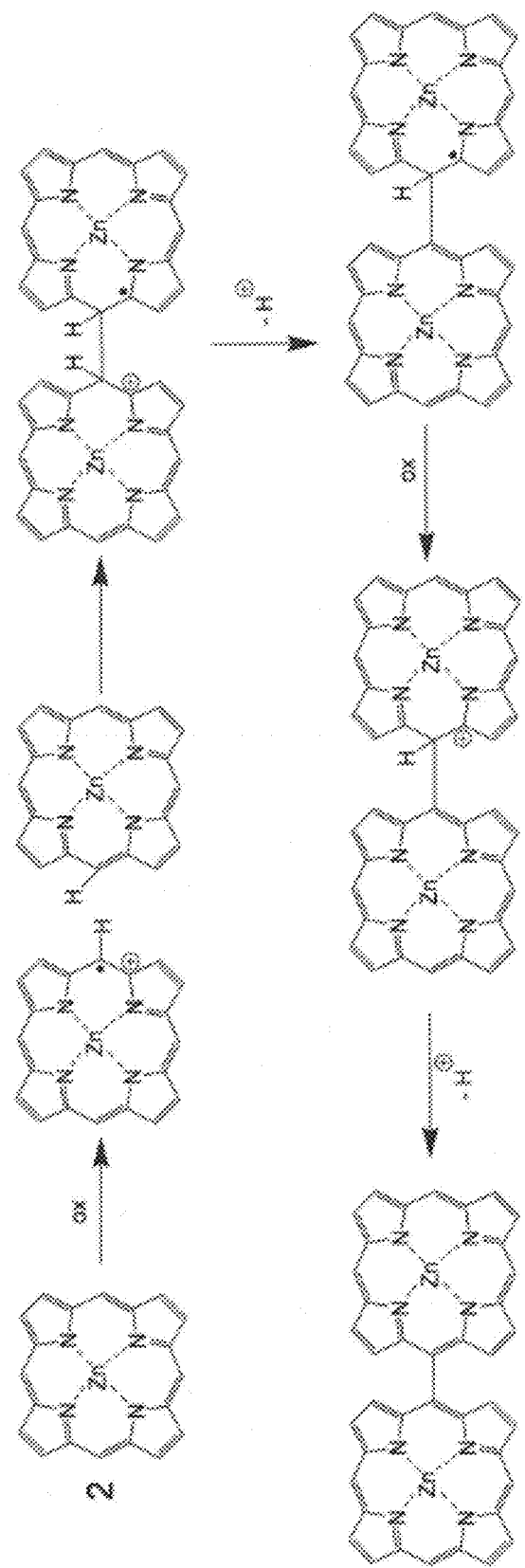
FIG. 4A illustrates a mechanism showing monomer coupling mechanism to form a dimer.
Figure 4B:
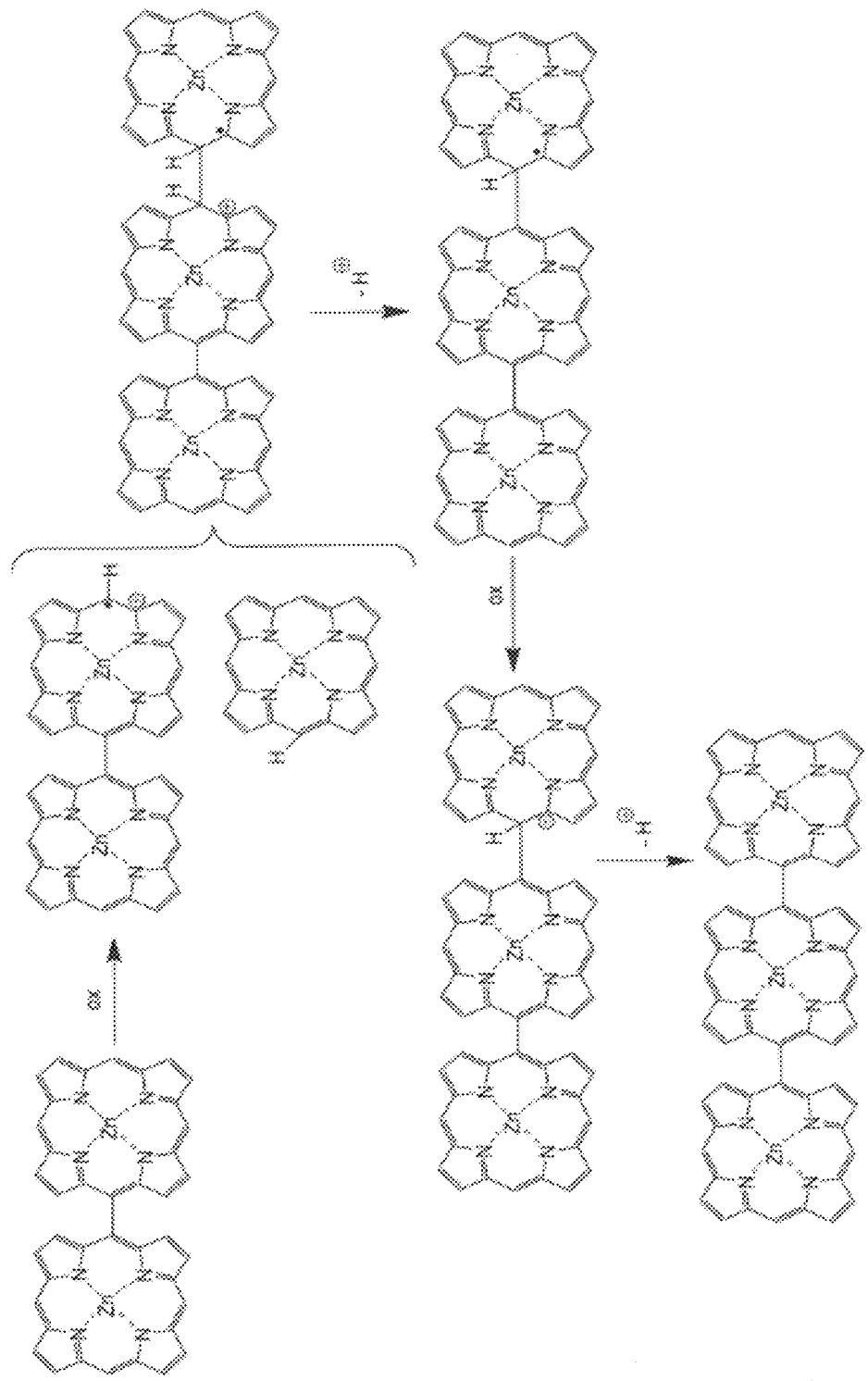
FIG. 4B the dimer further growth mechanism shows the formation of a trimer.
Figure 4C:
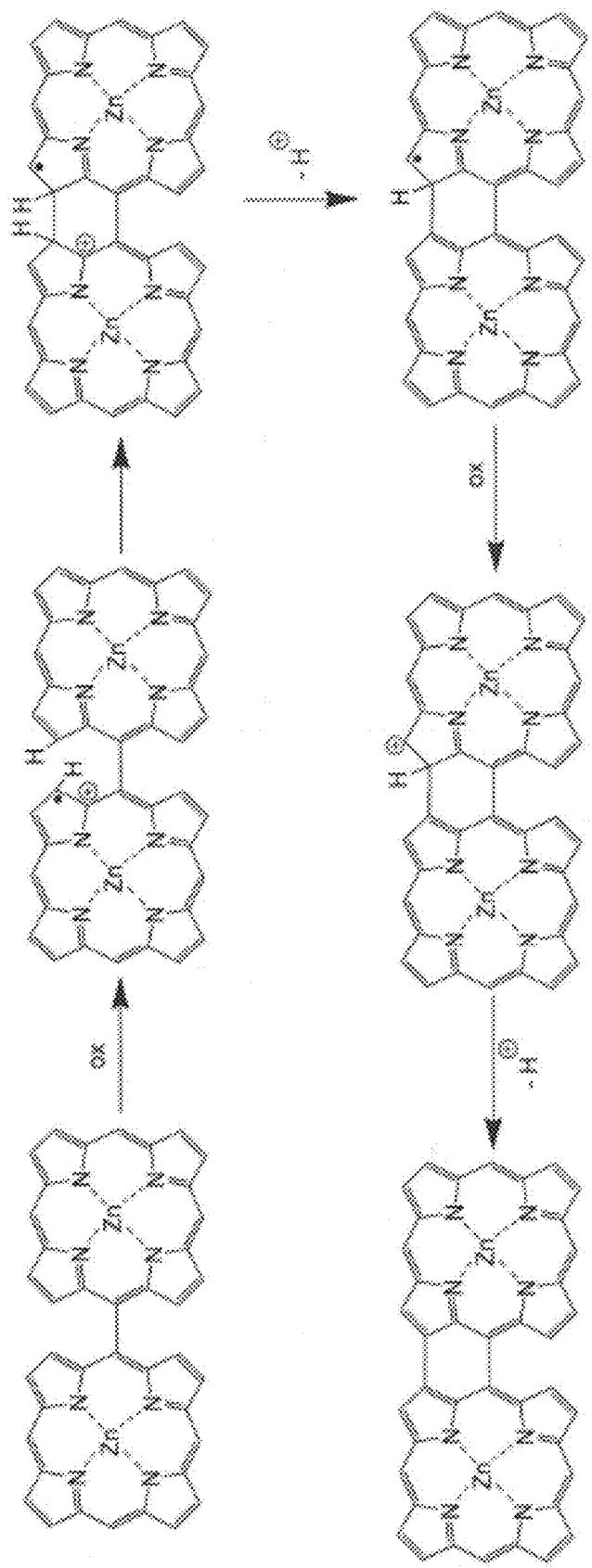
FIG. 4C illustrates the macrocycle fusion mechanism in the dimer.

An aspect of the invention is a porphene polymer. The monomer, porphyrin, contains several rings, including a macrocycle with 16 atoms, of which four are nitrogens and 12 are carbons. The macrocycle can contain either two protons ("free-base porphyrin") or a 2+ charged cation in the center of its ring ("metalloporphyrin"). When the protons are present, they are attached to two of the nitrogen atoms, diagonally disposed. When a double cation is present, it is attached to all four nitrogen atoms. In the porphene polymer, the monomer repeats in two dimensions. The structure of the monomer unit has been known, but the polymerization of the monomer as well as the resulting polymer are novel.

The synthetic method involves providing an aqueous fluid with an exposed surface area. A monomer of porphyrin or metalloporphyrin is provided to the exposed surface area. An oxidant is provided on either side of the surface to induce the coupling of the monomer to produce the polymer. Oxidant concentrations can be between about 0.01 mM and 10 mM.

In some embodiments, the porphyrin monomer can contain two protons in every macrocycle and in others it contains a doubly positive 2+ ion such as zinc, platinum, or nickel instead. In some embodiments, any transition or main-group metal dication or combination of transition or main-group metal dications that have been inserted into a monomeric porphyrin could be used with the polymeric porphene. Suitable metals include zinc, platinum, nickel, but there are other suitable double cation materials. By way of example the type of metal used in the starting monomer can alter the structure of the end polymer. When zinc is used, the structure of the resulting porphene polymer material is a double layer. When platinum is used, the structure of the porphene polymer material is a monolayer. When nickel is used, the structure of the porphene polymer material is a tube or coil. It is likely that preorganization of the monomeric metalloporphyrin on the surface of the aqueous subphase is different in each case as a result of the different number of ligands favored by different metals and of the non-planarity of certain metalloporphyrins.

The metal dication does not remain in the polymer and is leached into the aqueous subphase. Since the oxidant must be strong enough to perform a one-electron oxidation of the monomer, it is therefore also strong enough to oxidize the much more extensively conjugated polymer, injecting positive electron "holes" into it and charging it strongly positively. In some embodiments, the oxidant potential of the oxidant can be about 0.65 V against Ag/AgCl. X-ray reflectivity measurement illustrates the density of electrons projected into the normal to the surface and illustrates that the surface section of the aqueous sublayer contains an excess of anions and is thus negatively charged to compensate for the positive charges in the polymer. When transferred onto a substrate, electrons can move between the substrate and the polymer and the net positive charge of the porphene layer or layers can change. The actual charge on the polymer at final equilibrium will be a function of the nature of the substrate material. If the substrate is conducting, such as highly oriented pyrolytic graphite (HOPG) or indium tin oxide (ITO), and its electrical potential is well defined, it will dictate the position of the Fermi level and the degree of charging of the polymer. If it is insulating, the positive charge remaining on the polymer can be controlled by the selection of the substrate material. If the substrate is an insulating material, then it is more difficult to control the charge on the polymer. However, it is possible to remove all the positive charges by adding a reductant such as the iodide anion into the subphase before the transfer. Once the positive charges are removed, it is easy to insert metal dications into the macrocycles in the polymer by adding their salt into the subphase.

The porphene sheets can be synthesized as a single or a double layers by a suitable choice of metal in the starting metalloporphyrin. Sheets can also be folded or superimposed to form multilayers. These layers can be stacked, for example in a perfectly eclipsed manner (such that like atoms exactly above each other), or slipped with respect to each other in various directions, or even twisted about the surface normal by 0 to 45 degrees.

In some embodiments, about $1.5 \times 10^{14}$ monomers can be used to produce a 1 cm$^2$ of polymer. In some embodiments, the surface density of the polymer can be about 0.68 ng/cm$^2$. If the polymer is distributed in 1 cm$^2$ sheets, the effective molecular weight can be about $4.2 \times 10^{16}$ g/mole. When the material is a metalloporphene, the molecular weight or surface density of the free base porphene given above is scaled by the molecular weight of the metalloporphyrin monomer—12.1 g/mole)/(molecular weight of free base porphyrin—12.1 g/mole). One skilled in the art can calculate or determine the molecular weight when the surface density of the polymer is known.

Intimate contact places neighboring porphene sheets, depending on their degree of interlayer hydration, which, in turn, depends on the metal center, between about 0.3 nm and about 0.8 nm apart and their total number then dictates the thickness of the total polymer stack. The thickness of a single layer can be between about 0.3 nm and about 0.4 nm. Depending on the exact conditions of the synthesis, the observed lateral dimension of the sheets has been as small as 2 nm and as large as 10 mm across, and could possibly be even larger than 1 cm$^2$, in some embodiments up to 1 min length, width or both.

A Langmuir-Blodgett (LB) layer is prepared on an aqueous subphase. This method is described with relation to a LB trough, but one skilled in the art would understand other suitable systems to provide a layer on a subphase without deviating from the invention. Other suitable methods can also be used. The amount starting material to form LB layer will depend on the size of the LB trough and is chosen to maintain a desired mean molecular area between about 0.4 nm$^2$ and about 1.5 nm$^2$. The thickness of the LB layer can be between about 0.1 nm and about 5 nm. The aqueous subphase can be water (18 MOhm, deionized, distilled, tap or combinations thereof and devoid of all organic contaminants), or a salt solution. The amount of the aqueous subphase can be between a small drop to liters in volume and will again generally be dependent on the size of the LB trough. The concentration of the oxidant can be between about 0.01 mM and about 10 mM, in some embodiments about $10^{-5}$ M. The oxidant can be $K_2IrCl_6$, $Ce(NO_3)_6^{2-}$, $ClO_2$, $ClO_3^-$, $Ru(bipy)_n^{3+}$, $Os(bipy)_n^{3+}$, or $Ru(CN)_6^{3-}$. The amount of the unsubstituted porphyrin added to the system can be between about 1 ng and about 1 mg and again depend on the size of the trough. The ratio of the unsubstituted porphyrin to the oxidant/aqueous subphase can be between about 1:1 and about 1:10. The temperature after the oxidant is added to the aqueous subphase can be between about 0° C. and about 100° C., in some embodiments between about 22° C. and about 30° C. The course of oxidative polymerization can be monitored on the surface of the LB trough using suitable methods including isotherm determination, UV-vis absorption, grazing incident diffraction (GIXD), X-ray reflectivity (XR) or combinations thereof until the polymer is formed on at least 10% of the surface area of the LB layer.

A pressure can be applied to the monomers during the formation of the polymer. By way of example, when a LB trough is used the surface pressure change relative to a clean subphase surface can be less than about 1 nM/m. In some embodiments, the temperature during the polymerization process can be between about 20° C. and about 40° C., in some embodiments about 25° C. The reaction can take place in ambient light. The reaction can also take place in saturated humidity, which can be provided by using a cover (e.g. a dust cover) on the system. In some embodiments, about 24 hours can be needed to result in the maximum degree of polymerization.

Notably, the resulting polymer is a free base. The metal (e.g. zinc, platinum or nickel) present in the monomer will be leached out into the aqueous subphase. Though not wanting to be bound by theory, it is believed that the oxidizing agent selected is strong enough to oxidize the monomer to its radical cation to initiate its polymerization. The much more highly conjugated polymer is easier to oxidize to a polyradical polycation and in its oxidized positively charged state expels the metal cation into the subphase. The concentration of the metal remaining in the polymer porphyrin is less than about 1%, in some embodiments.

A reducing agent, such as an iodide, sulfite, thiosulphate, and the like can be added to the subphase mixture at a concentration of between about 0.001M and about 0.1M. The reducing agent reduces/destroys the oxidizing agent. The reducing agent also reduces the polymer present on the surface to an electroneutral state. In some embodiments, a desired cation can be added to the subphase mixture. The desired cation can be $Zn^{2+}$, $Fe^{2+}$, $FeCl^{2+}$, or other divalent cations, and combinations thereof. The cation can be added to the subphase mixture by adding its salt to a concentration of about 0.01 M to about 0.1 M. The cation of the subphase mixture can insert itself into the porphene that is present on the LB layer. The cation can be present in between a small fraction and about 1000:1 of the porphene depending on the desired final fraction or rate of insertion.

The polymer can be transferred from the aqueous subphase surface to a substrate using standard LB techniques. Suitable substrates include a solid substrate, a metal grid or lacey carbon substrate. The material of the substrate can be a metal, such as stainless steel, an aluminum alloy, gold, and oxide, such as indium tin oxide; a polymer, such as PMMA; glass; other materials, such as a germanium or silicon substrate, terraces of HOPG or combinations thereof. The transfer to the substrate can occur after a set period of time or at intervals during the polymerization process. In some embodiments, the surface of the substrate can be pretreated by washing the surface successively with tetrahydrofuran (THF), spectroscopic grade chloroform, spectroscopic grade benzene and spectroscopic grade isopropanol with air drying between each step. In some embodiments, substrates can be treated in Nano-strip® for about 10 mins. followed by the solvent treatment. Following the transfer to the substrate, the cation (when present) remains in the porphene. Further, the porphene can cover between about 1% and about 100% of the surface area of the substrate. In some embodiments, the strength of the porphene to the substrate can be quite high and comparable to paint or other well-known coatings.

The transferred polymer can form ultrathin (between about 0.3 nm and about 50 nm, in some embodiments about 1 nm) flakes. The width/length of the flakes can be between 10 nm and about 10 mm, in at least one dimension.

In some embodiments, ligands, for example water, can be present in the polymer. Removing the ligands can reduce the interlayer spacing by an amount that is dependent on the size and type of ligand removed. To remove water ligands, a porphene sample transferred to a substrate by LB techniques is heated under a controlled atmosphere ($N_2$, Ar or clean air) at about 130° C. for 1 hour.

An aspect of the invention is a method of using the porphene material. There are many potential uses: as separation membranes, for example a membrane that would permit the passage of small cations (H+, Li+, etc.) to be more facile than that of larger cations, as constituents of metalorganic materials (MOFs), as sensors, catalytic and electrocatalytic materials, as components in nanoelectronics, as heterojunction materials, as memory or qubit elements, as means of positioning metal atoms or metal clusters on a surface in regular square arrays, etc.

EXAMPLES

Example 1: Formation of Bilayer Porphene from Zinc Porphyrin

Figure 5:
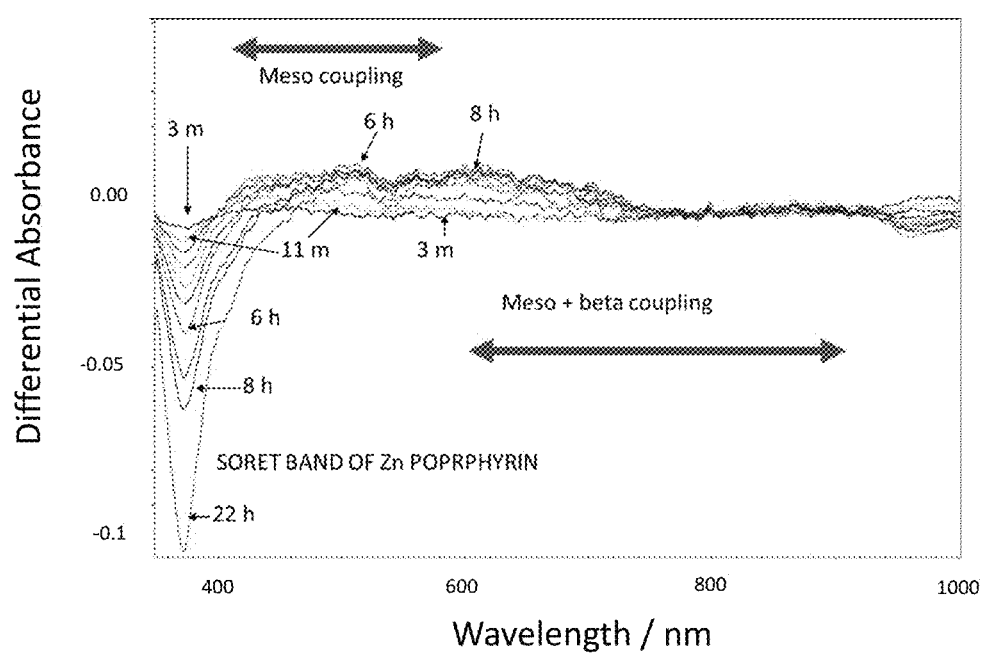
FIG. 5 illustrates a time series of UV-vis spectra showing the transformation of zinc porphyrin (ZnP) to porphene by oxidative polymerization.

Porphene was produced from the oxidative coupling of zinc porphyrin monomers at the air water interface of a Langmuir-Blodgett (LB) trough. Zinc porphyrin was either synthesized (method described in the Porphyrin Handbook, previously incorporated by reference) or commercially obtained and spread from a benzene solution onto the aqueous subphase using standard Langmuir-Blodgett techniques to obtain a mean molecular area (mmA) of 125 $Å^2$. In this concentration range the monomers lie flat on the surface of the liquid subphase. An oxidant, $10^{-5}$ M $K_2IrCl_6$, was added to the aqueous subphase to induce oxidative polymerization of the monomers on the surface. The reaction progress was monitored in situ over the course of several hours using UV-vis absorption. UV-vis spectra of the surface of the aqueous phase were collected as a function of time in the compartment of a Cary 2000 double-beam spectrometer. FIG. 5 illustrates the difference between UV-vis spectra collected at various time intervals (t=x) and the spectrum collected at t=0 prior to the addition of the oxidant. As the polymerization reaction proceeds there is a gradual loss of the Soret band (at about 375 nm) which is attributed to the loss of zinc porphyrin monomer and there is an increase in broad unstructured peaks at longer wavelengths (>450 nm) that are associated with the meso-meso and the beta-beta coupling of monomers to form the polymer. Subtracted is the spectrum of the uncoupled ZnP at t=0.

Figure 6:
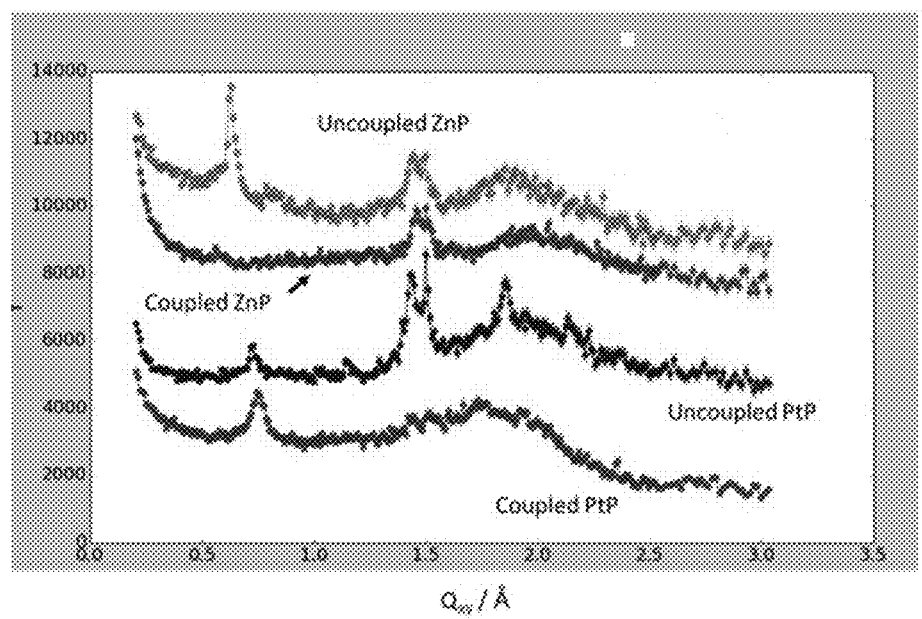
FIG. 6 illustrates the grazing incidence X-ray diffraction (GIXD) of bilayer porphene prepared from Zn-porphyrin and monolayer porphene prepared from Pt-porphyrin by oxidative polymerization at the air/water interface.

GIXD and X-ray Reflectivity data were collected using the synchrotron using the ChemMat/CARS facility at the APS synchrotron at Argonne National Laboratory. The upper part of FIG. 6 illustrates the GIXD spectrum of the zinc porphyrin monomers and of porphene at approximately 6 hrs. following initiation of the reaction. Zn-porphene is a bilayer, and Pt-porphene is a monolayer.

Figure 7A:
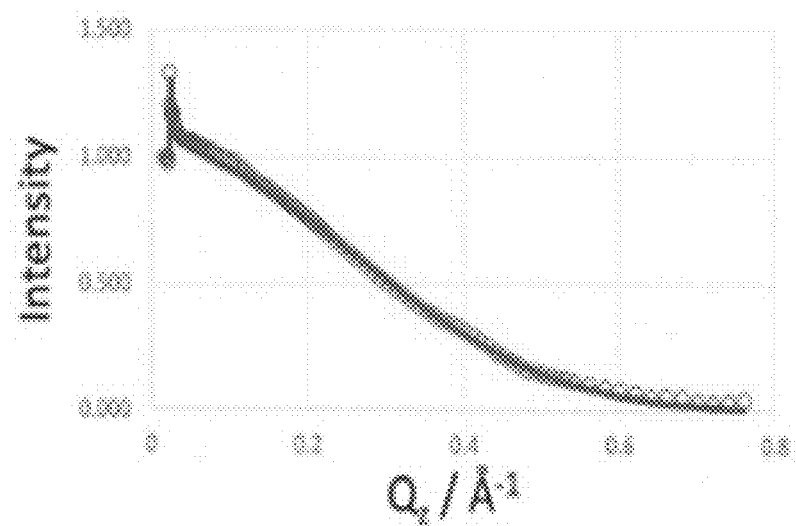
FIG. 7A illustrates a X-ray reflectivity of a layer of monomeric zinc porphyrin at the air/water interface.
Figure 7B:
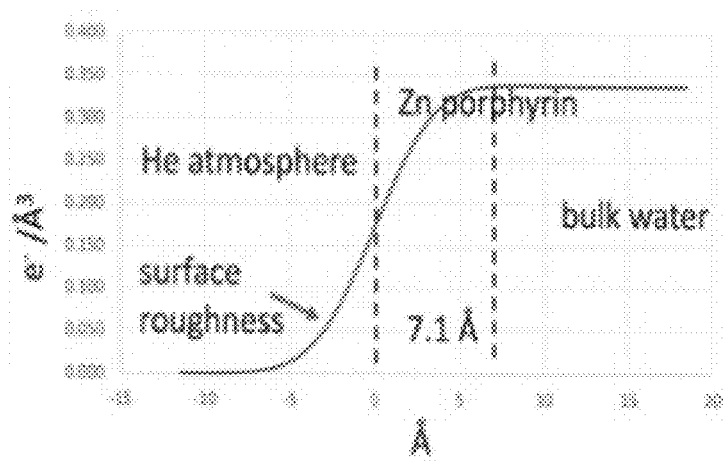
FIG. 7B illustrates the fitted electron density of a layer of monomeric zinc porphyrin.
Figure 8A:
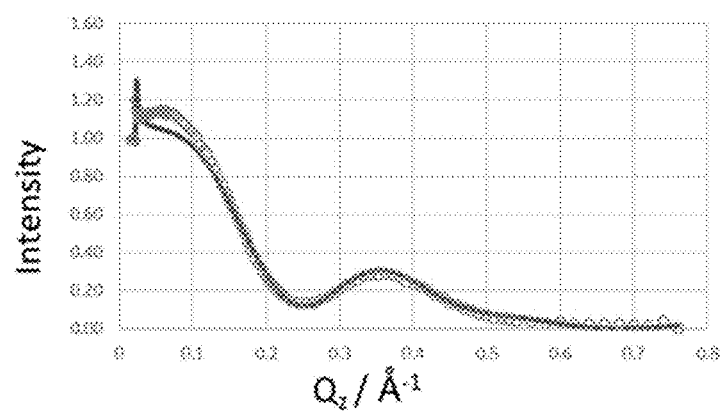
FIG. 8A illustrate a X-ray reflectivity of a porphene film synthesized from zinc porphyrin at the air/water interface.
Figure 8B:
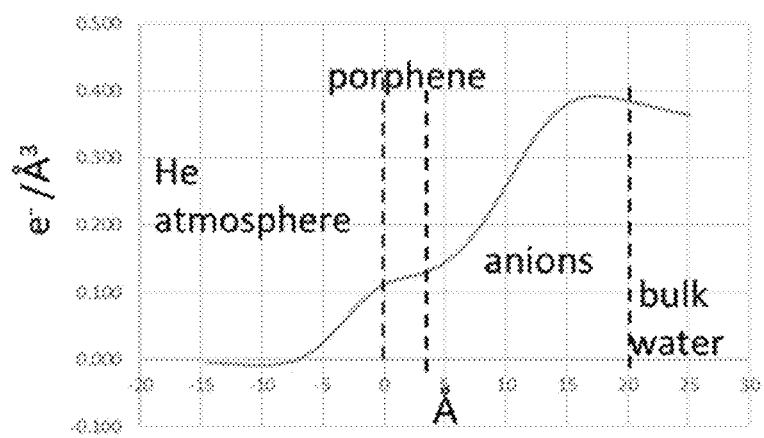
FIG. 8B illustrates the fitted electron density of zinc porphene showing the contribution of the anions just below the water surface.

FIGS. 7A and 8A illustrate X-ray reflectivity measurements, while FIGS. 7B and 8B illustrate the density of electrons projected normal to the surface for the zinc porphyrin and porphene, respectively. The data show that the resulting polymer has a bilayer structure with two planar sheets positioned parallel to one another. The polymer is in its free-base form indicating that the zinc that is present in the monomer, and in the polymer following its initial formation, is leached out from the polymer into the subphase. The loss of zinc from the polymer is attributed to the net positive charge on the polymer due to injection of holes into the polymer by the oxidant. Notably, the density of electrons projected normal to the surface of the subphase, determined from X-ray reflectivity data, shows a surface section of the aqueous sublayer that contains an excess of anions to compensate for the positive charges in the polymer (see FIG. 8B).

Figure 9:
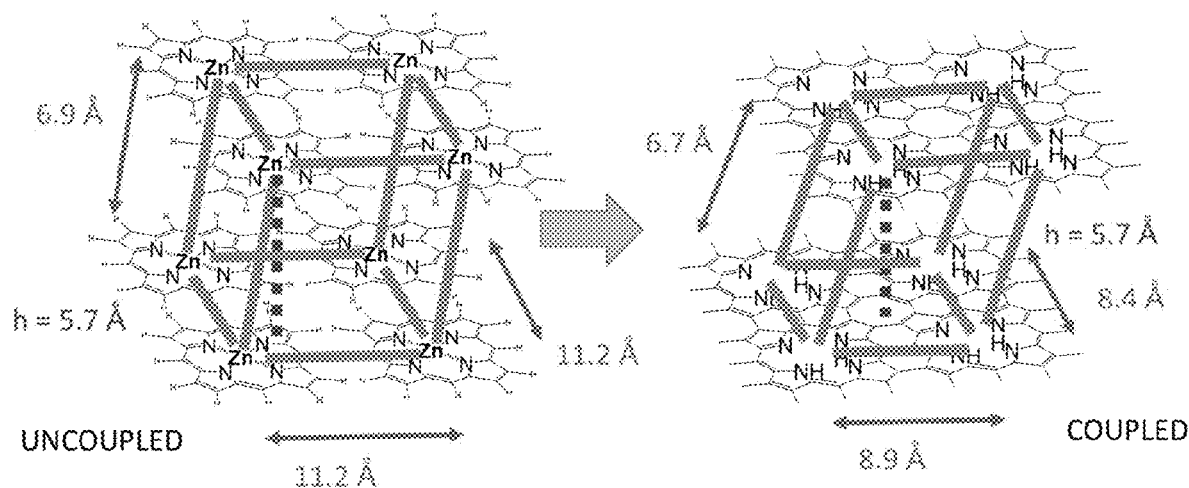
FIG. 9 illustrates unit cell for a double layer of porphene produced by oxidative polymerization of Zn-porphyrin at the air/water interface (uncoupled before polymerization and coupled after polymerization)

The GIXD and X-ray reflectivity data were used to derive the dimensions of the unit cells and the bilayer structures of the assemblies before oxidative coupling and after coupling. These results are provided in FIG. 9 (uncoupled on the left and coupled on the right). Before the oxidative coupling, the side of the four Zn square is 11.2 Å long and the two layers are shifted diagonally by −¼ of the unit cell, such that the Zn atoms of one layer are located approximately above a pyrrole ring of the other. The area of the unit cell is 62.7 $Å^2$ and the bilayer thickness is 7.1 Å.

In the oxidatively polymerized coupled structure, the zinc previously present has now been leached from the structure such that the polymer is in the free-base form. In this case, the distance between centers of the nitrogen quadrangle is 8.9 Å, the two layers are shifted diagonally by ½ of the unit cell such that center of the nitrogen quad of one layer is located above an 8-membered ring of the other layer. Other properties are listed in Table 1.

TABLE 1

|  | Uncoupled | Coupled |
| --- | --- | --- |
| Angle (degrees) | 66.1 (α) | 53.0 (β) |
| Length (Å) | 11.2 | 8.9 |
| Width (Å) | 11.2 | 8.4 |
| Angled height (Å) | 6.9 | 6.7 |
| Height (Å) | 5.7 | 5.7 |
| Thickness from reflectivity (Å) | 7.1 | 32 |
| Single crystalline domain length (nm) | >80 | >80 |
| Mean molecular area ($Å^2$) | 62.7 $Å^2$ cf. 62 $Å^2$ from LB isotherm | 36.4 $Å^2$ cf. 30-40 $Å^2$ from LB isotherm |

Notably, the X-ray reflectivity data provides a bilayer thickness of 32 Å, however, this number contains an unknown contribution from the layer of $IrCl_6^{2-}$ counterions expected to accompany the positively charged polymer.

The bilayer porphene sheets were transferred onto a substrate for further analysis. The transferred polymer forms ultrathin (~1 nm) flakes up to several mm across. When transferred onto a substrate, electrons can move between the substrate and the polymer and the net positive charge of the porphene layer or layers can change. The actual charge on the polymer at final equilibrium will be a function of the nature of the substrate material. If the substrate is conducting (e.g., such as in highly oriented pyrolytic graphite (HOPG) or indium tin oxide (ITO)) and its electrical potential is well defined, it will dictate the position of the Fermi level and the degree of charging of the polymer. If the substrate is insulating, the positive charge remaining on the polymer can be controlled by the selection of the substrate material. However, all positive charges can also be removed from the polymer before the transfer by treatment with a reductant, such as the iodide or bisulfite anion (see example 5).

Figure 10:
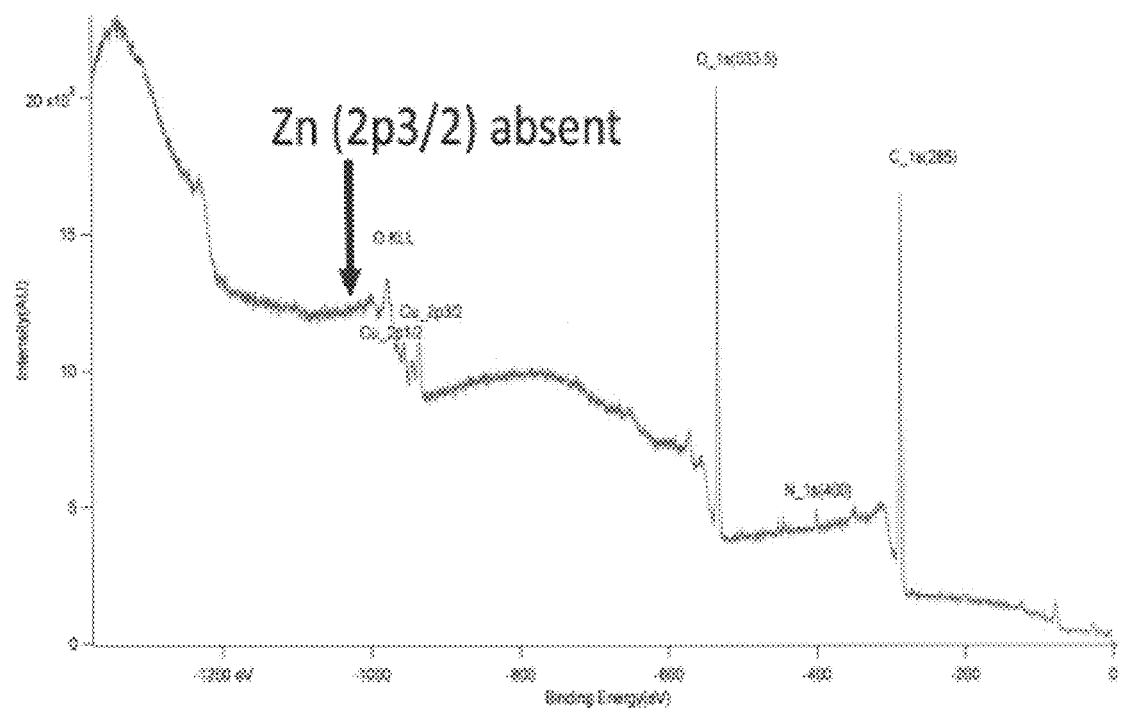
FIG. 10 illustrates a X-ray photoelectron spectrum (XPS) of porphene produced by oxidative polymerization of Zn-porphyrin prior to transfer to a substrate.

Porphene sheets were transferred onto Si, ITO or HOPG substrates and were analyzed using X-ray photoelectron spectroscopy (XPS, KRATOS). FIG. 10 illustrates a X-ray photoelectron spectrum (XPS) of porphene produced by oxidative polymerization of Zn-porphyrin prior to transfer to a substrate. The data illustrated in FIG. 10 confirm that the polymer is in the free-base form and that essentially all of the zinc has been leached from the polymer. The spectrum shows intense $C_{1s}$ and $O_{1s}$ peaks and weaker $N_{1s}$ peak. The $O_{1s}$ peak indicated that polymer is hydrated.

Figure 11:
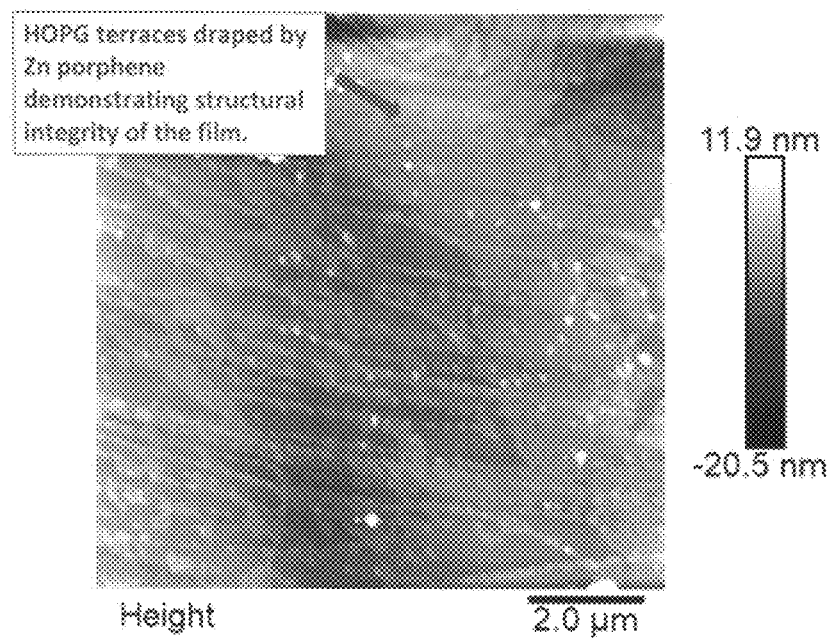
FIG. 11 illustrates an atomic force microscopy (AFM) image of a double sheet of porphene after transfer to a HOPG substrate, tens of microns in size, synthesized from zinc porphyrin.
Figure 12:
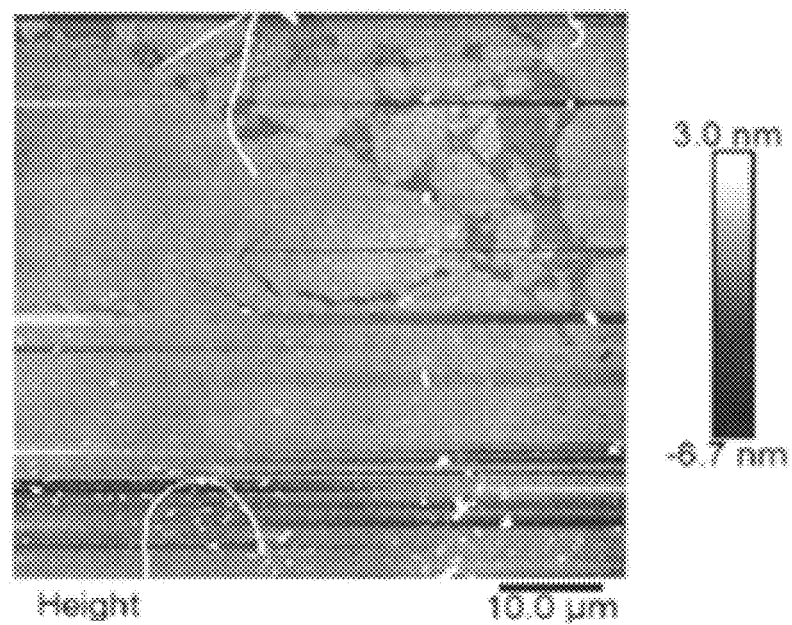
FIG. 12 illustrates an AFM image of a double sheet of porphene after transfer to a Ge substrate, tens of microns in size, synthesized from zinc porphyrin.

FIGS. 11 and 12 illustrate atomic force microscopy (AFM) images of the bilayer porphene sheets after transfer to HOPG and germanium substrates, respectively. These images show the durability of the polymer film. The first image shows terraces of HOPG draped by a sheet of porphene. The second image shows micron sized islands of porphene. However, also apparent are tears in the sheet due to the transfer of the film to the substrate.

Example 2: Formation of Porphene Sheets from Platinum Porphyrin

Porphene was produced from the oxidative coupling of platinum porphyrin monomers at the air water interface of a LB trough using a method similar to that described in Example 1. Platinum porphyrin was synthesized from commercially obtained porphine (free-base porhyrin) and spread on to the aqueous subphase from a benzene solution using Langmuir-Blodgett techniques to obtain a mean molecular area (mmA) of 125 Å$^2$. The aqueous subphase was adjusted to about $10^{-4}$ M $K_2IrCl_6$ to induce oxidative polymerization of the monomers on the surface. Polymerization was complete after 6-8 hours.

The reaction progress was monitored using GIXD. The lower part of FIG. 6 shows the GIXD of the Pt-porphyrin monomer and porphene polymerization. The Pt-monomer forms a buckled monomer layer on the aqueous surface and has a Pt-Pt distance of 8.7 Å and a mean molecular area of 80 Å$^2$ at 10 nM/M. The resulting porphene polymer is in the free-base form and is a flat single sheet with a center-to-center (i.e., measured from the center of one monomer to the center of a neighboring monomer) distance of 8.4 Å and a mean molecular area of 70 Å$^2$ at 2.5 nm/m.

Figure 13:
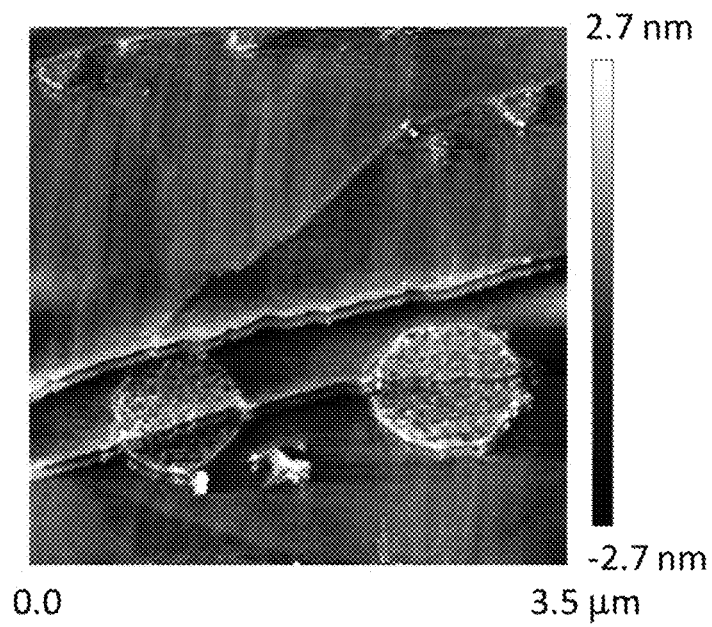
FIG. 13 illustrates an AFM image of porphene sheets synthesized from Pt-porphyrin, conforming to HOPG step edges.
Figure 14:
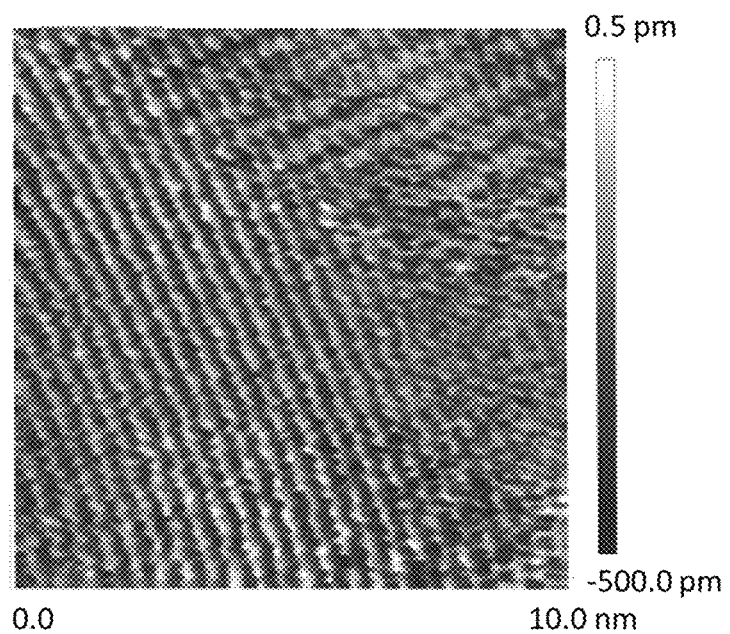
FIG. 14: Ambient Scanning Tunneling Microscopy (STM) image of porphene sheet synthesized from Pt-porphyrin, after transfer to a HOPG substrate.
Figure 15:
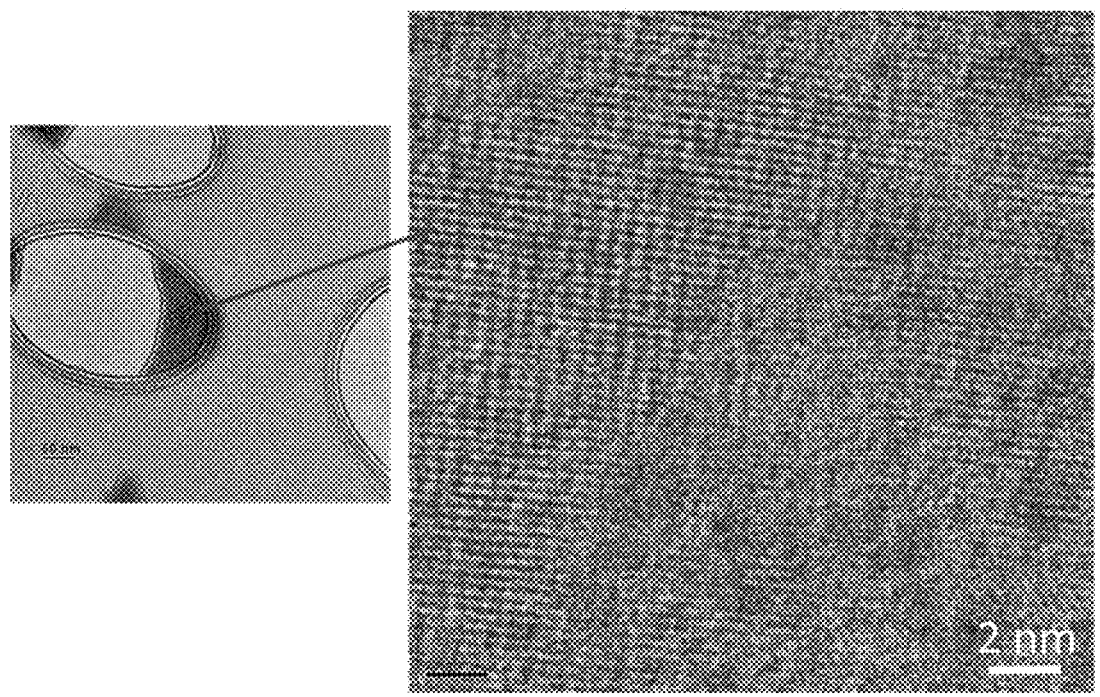
FIG. 15 illustrates a Transmission Electron Microscopy (TEM) image of porphene monolayer synthesized from Pt-porphyrin and suspended over a hole in lacey carbon. Magnification: 490 000×, beam energy: 200 keV.

The porphene sheets were transferred onto a substrate for further analysis. FIG. 13 shows an AFM image of porphene on a HOPG substrate. The image shows micrometer-sized flakes or islands of the porphene that conform to step edges on the surface. FIG. 14 shows ambient Scanning Tunneling Microscopy (STM) image of porphene sheet synthesized from Pt-porphyrin, after transfer to a HOPG substrate. FIG. 15 illustrates a Transmission Electron Microscopy (TEM) image of porphene monolayer synthesized from Pt-porphyrin and suspended over a hole in lacey carbon. Magnification: 490 000×, beam energy: 200 keV. The image shows flakes of porphene that are approximately hundreds of nanometer in diameter. Magnification of the image shows the organization of the monomer layer.

Example 3: Formation of Porphene Tubes from Nickel Porphyrin

Porphene was produced from the oxidative coupling of nickel porphyrin monomers at the air water interface of a LB trough using a method similar to that described in Example 1. Nickel porphyrin was synthesized from commercially obtained porphine (free-base porphyrin) and spread on to the aqueous subphase from a benzene solution using standard Langmuir-Blodgett techniques to obtain a mean molecular area (mmA) of 125 Å$^2$. The aqueous subphase was adjusted to about $10^{-4}$ M $K_2IrCl_6$ of the aqueous subphase to induce oxidative polymerization of the monomers on the surface. Polymerization was complete after 6-8 hours.

Figure 16A:
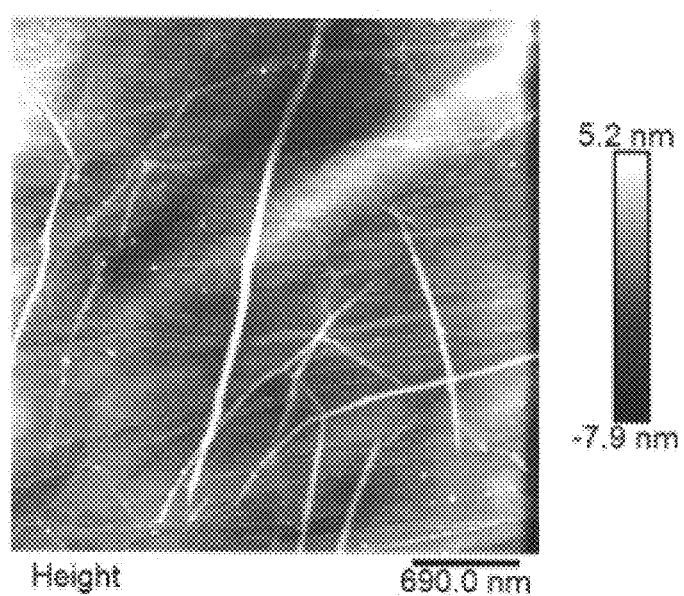
FIG. 16A illustrate an AFM image of Ni-porphene on a HOPG substrate.
Figure 16B:
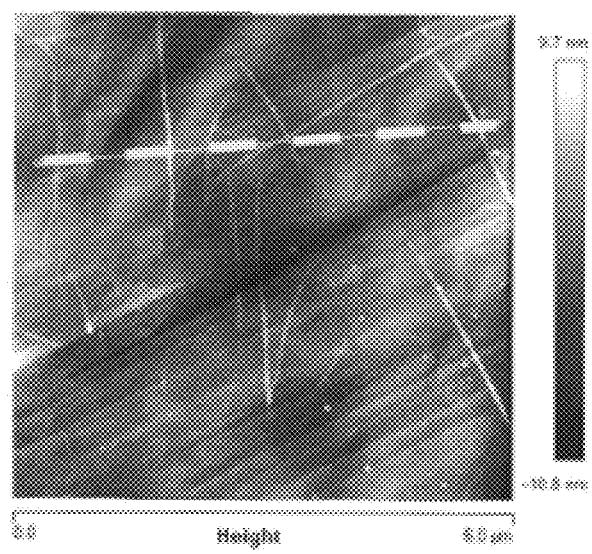
FIG. 16B illustrate an AFM image of Ni-porphene on a HOPG substrate.
Figure 16C:
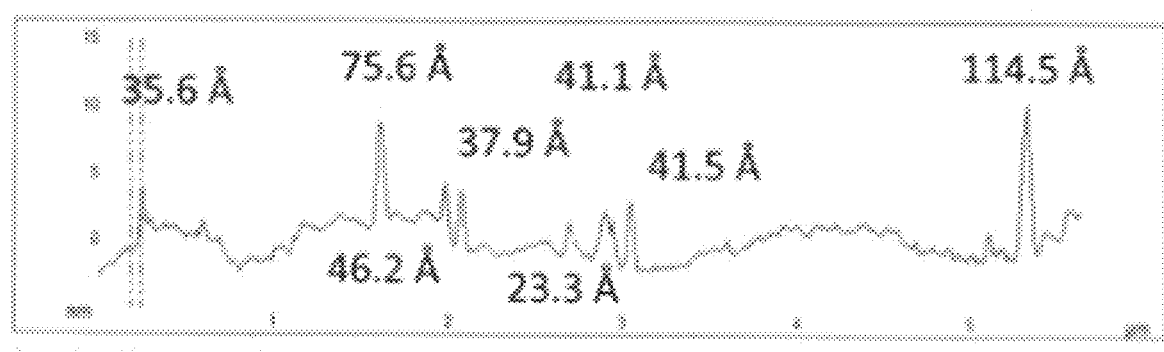
FIG. 16C illustrates the cross section analysis of the tube heights.

Following polymerization, porphene was transferred onto a substrate for further analysis. FIGS. 16A and 16B illustrate an AFM image of Ni-porphene on a HOPG substrate. The formation of porphene from nickel porphyrin results in a porphene nanotubes that range in height from 20 to 80 Å. FIG. 16C illustrates the cross section analysis of the tube heights.

Example 4: Formation of Bilayer Porphene from Free-Base Porphyrin

Porphene was produced from the oxidative coupling of the free-base porphyrin monomers at the air water interface of a Langmuir-Blodgett (LB) trough using a method similar to that described in Example 1. Porphine (free-base porphyrin) was obtained commercially and spread on to the aqueous subphase from a benzene solution using Langmuir-Blodgett techniques to obtain a mean molecular area (mmA) of 125 Å$^2$. The aqueous subphase was adjusted to about $10^{-4}$ M $K_2IrCl_6$ to induce oxidative polymerization of the monomers on the surface. Polymerization was complete after 6-8 hours.

Figure 17A:
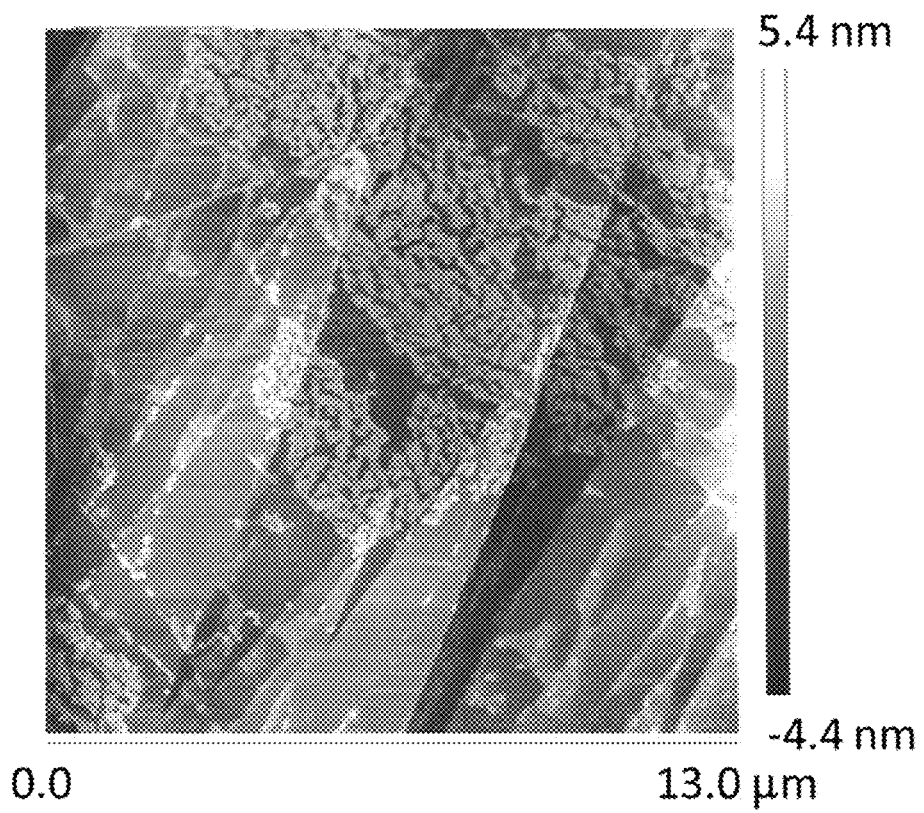
FIG. 17A illustrates an AFM image of porphene single layer sheets on a HOPG substrate.
Figure 17B:
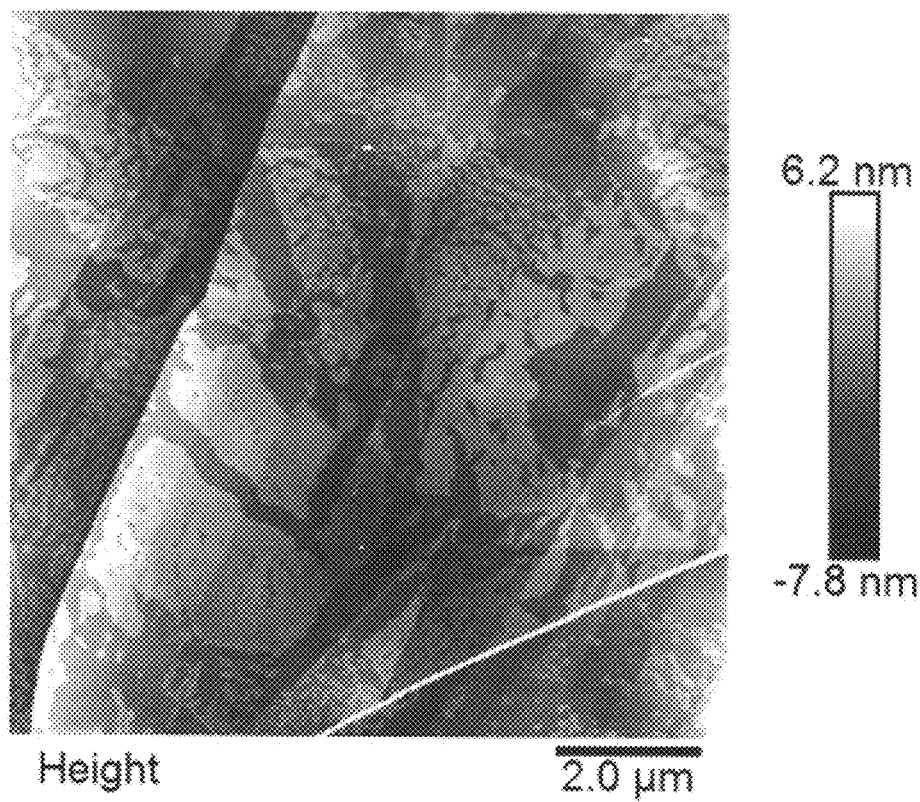
FIG. 17B illustrates an AFM image of porphene single layer sheets on a HOPG substrate.

Following polymerization, porphene was transferred onto a substrate for further analysis. FIG. 17A and FIG. 17B illustrates an AFM image of porphene on a HOPG substrate. FIG. 17B illustrates a more cohesive layer compared to the porphene illustrated in FIG. 17A.

Example 5: Formation of Zn-Porphene Sheet

Porphene was produced from the oxidative coupling of zinc porphyrin monomers at the air water interface of a LB trough using a method similar to that described in Example 1 except that following polymerization, a reducing agent (1 mMoles of NaI) was added to the aqueous subphase (250 mL) to destroy the oxidizing agent and reduce the polymer to an electroneutral state. $Zn^{2+}$ cations were then re-introduced into the porphene bilayer. $ZnCl_2$ (1.3 mMoles) was added to the aqueous subphase (250 mL) to form Zn-porphene bilayer sheets after the reduction was completed.

The full formation of the Zn-porphene sheet requires 24 hours. The transformation to Zn-porphene is verified by IR spectroscopy.

Example 6: Formation of Fe-Porphene Sheets

Figure 18:
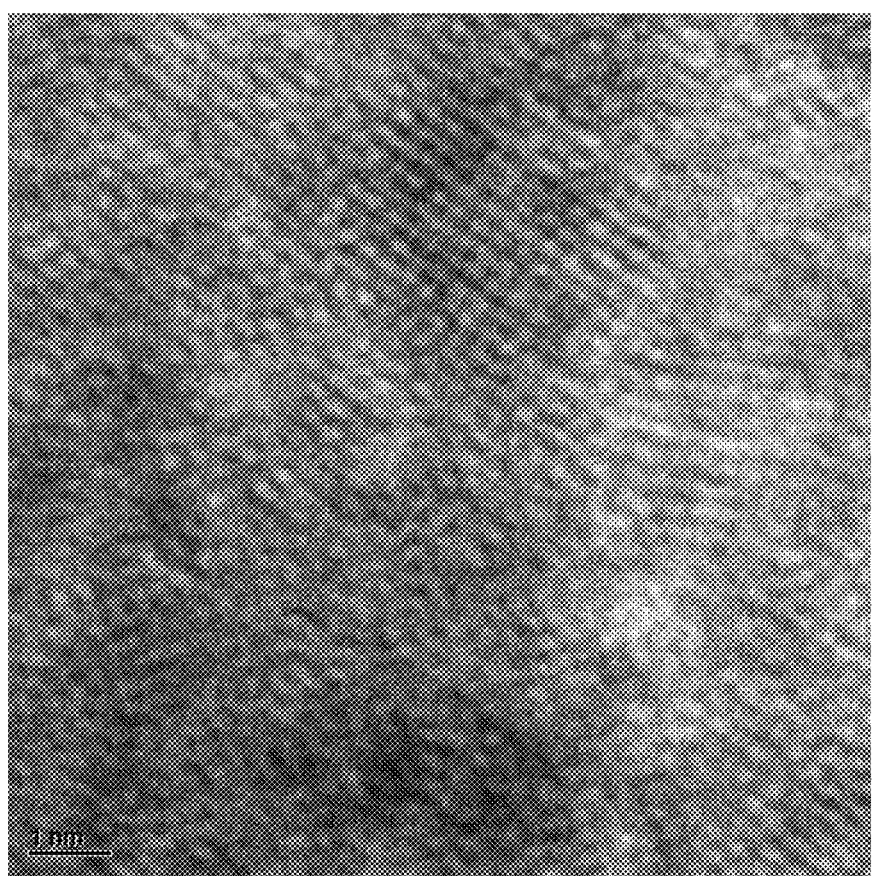
FIG. 18 illustrates the TEM image of Fe-porphene on lacey carbon obtained at a beam energy of 200 keV and 1,460,000× magnification.

Fe-porphene was synthesized from free base porphyrin to form porphene and Fe was subsequently introduced into the polymer. Fe-porphene was transferred onto a lacey carbon substrate. FIG. 18 shows the TEM image obtained at a beam energy of 200 keV and 1,460,000× magnification. The image shows the ordered structure of the monomer layers.

Ranges have been discussed and used within the forgoing description. One skilled in the art would understand that any sub-range within the stated range would be suitable, as would any number within the broad range, without deviating from the invention.

The foregoing description of the present invention, related to a porphene polymer and methods of making the same, has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

The invention claimed is:

1. A porphene polymer, comprising:
   polymerized monomers of porphyrin, wherein the porphyrin is a macrocyclic molecule comprising four nitrogen atoms, wherein a structure of the porphene polymer is a single layer, a double layer, or a multilayer, wherein a thickness of the single layer, double layer, or multilayer is no more than about 5 nm, wherein the monomers of porphyrin are directly fused to each other, and wherein the single layer, double layer, or multilayer is at least three monomers of porphyrin in length and at least three monomers of porphyrin in width.

2. The polymer of claim 1, wherein the porphene polymer further comprises a dication.

3. The polymer of claim 2, wherein the dication is zinc, platinum, iron, nickel, or two hydrogen atoms, and combinations thereof.

4. The porphene polymer of claim 1, wherein a charge of the porphene polymer is neutral.

5. The porphene polymer of claim 1, wherein the polymer comprises meso-meso and meso-beta bonds.

* * * * *